US010152837B1

(12) United States Patent
Mallard

(10) Patent No.: US 10,152,837 B1
(45) Date of Patent: Dec. 11, 2018

(54) SYSTEM AND METHOD FOR INTEGRATING CREDENTIAL READERS

(71) Applicant: George Mallard, The Woodlands, TX (US)

(72) Inventor: George Mallard, The Woodlands, TX (US)

( * ) Notice: Subject to any disclaimer, the term of this patent is extended or adjusted under 35 U.S.C. 154(b) by 0 days.

(21) Appl. No.: 15/394,600

(22) Filed: Dec. 29, 2016

(51) Int. Cl.
*G07C 9/00* (2006.01)
*G06K 7/10* (2006.01)

(52) U.S. Cl.
CPC ...... *G07C 9/00111* (2013.01); *G06K 7/10316* (2013.01)

(58) Field of Classification Search
CPC ............................ G06K 19/07749; H01Q 7/00
USPC ........................................................ 340/5.61
See application file for complete search history.

(56) References Cited

U.S. PATENT DOCUMENTS

| 4,115,394 | A | 9/1978 | Hoehn |
| 5,144,544 | A | 9/1992 | Jenneve |
| 7,091,859 | B2 | 8/2006 | Duron et al. |
| 7,180,423 | B2 | 2/2007 | Forster |
| 7,830,324 | B2 | 11/2010 | Eray |
| 7,973,662 | B2 | 7/2011 | Phipps et al. |
| 8,749,390 | B2 | 6/2014 | Eray |
| 2007/0174907 | A1* | 7/2007 | Davis ................... G06Q 20/327 726/9 |
| 2007/0222604 | A1* | 9/2007 | Phipps ................. G06K 7/0008 340/572.7 |
| 2011/0266883 | A1* | 11/2011 | Eray .................... H01Q 1/2225 307/104 |
| 2013/0043887 | A1* | 2/2013 | Ziolkowski .............. F17D 5/00 324/649 |
| 2013/0187457 | A1* | 7/2013 | Schlichter ............. H04L 12/10 307/31 |
| 2013/0254574 | A1* | 9/2013 | Zacchio ............ H04W 52/0229 713/323 |

FOREIGN PATENT DOCUMENTS

EP 2779305 A1 9/2014
WO WO2004107251 12/2005

OTHER PUBLICATIONS

W.W. Smith, The Radio Antenna Handbook, 1936, p. 11.
Radiotron Designer's Handbook , 1941, pp. 125-126, 139.
W.W. Smith, The Radio Handbook , 1938, p. 282.
Pulse a Technitrol Company, Understanding Common Mode Noise G019.A.
Telecommunications Industry Association, TIA/EIA Standard, 2001.

* cited by examiner

Primary Examiner — Fabricio R Murillo Garcia

(57) ABSTRACT

A system and method for reading a credential for an access system is provided. The system may include a plurality of readers, link coupling assemblies and a read head housing a plurality of credential pickup coils of the link coupling assemblies. When a user places a credential, the plurality of readers, via link coupling, determines whether the credential utilizes the same modulation technology, and the reader which utilizes the same modulation technology reads the credential, thereafter determining whether or not to grant the user access.

28 Claims, 5 Drawing Sheets

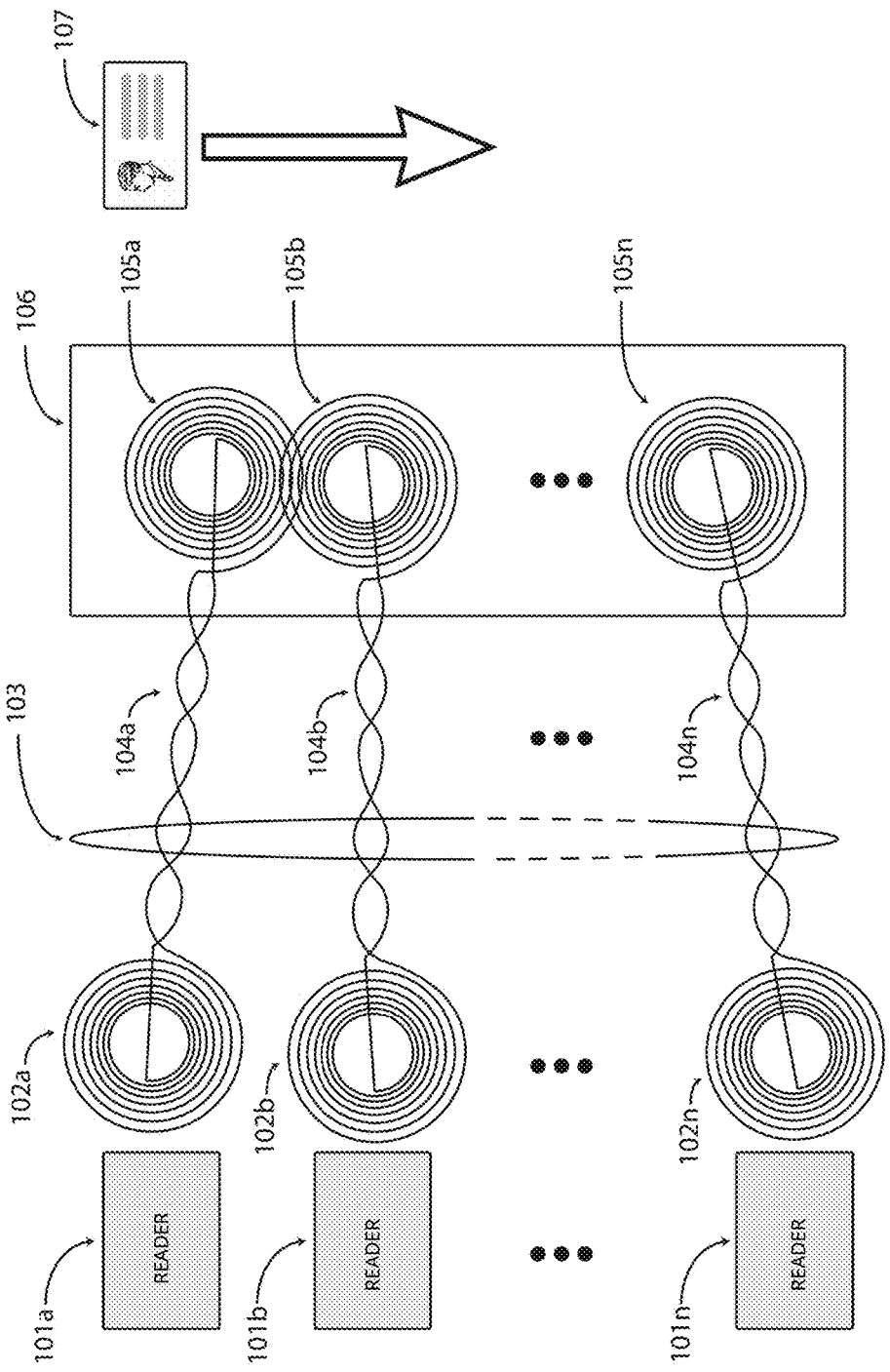

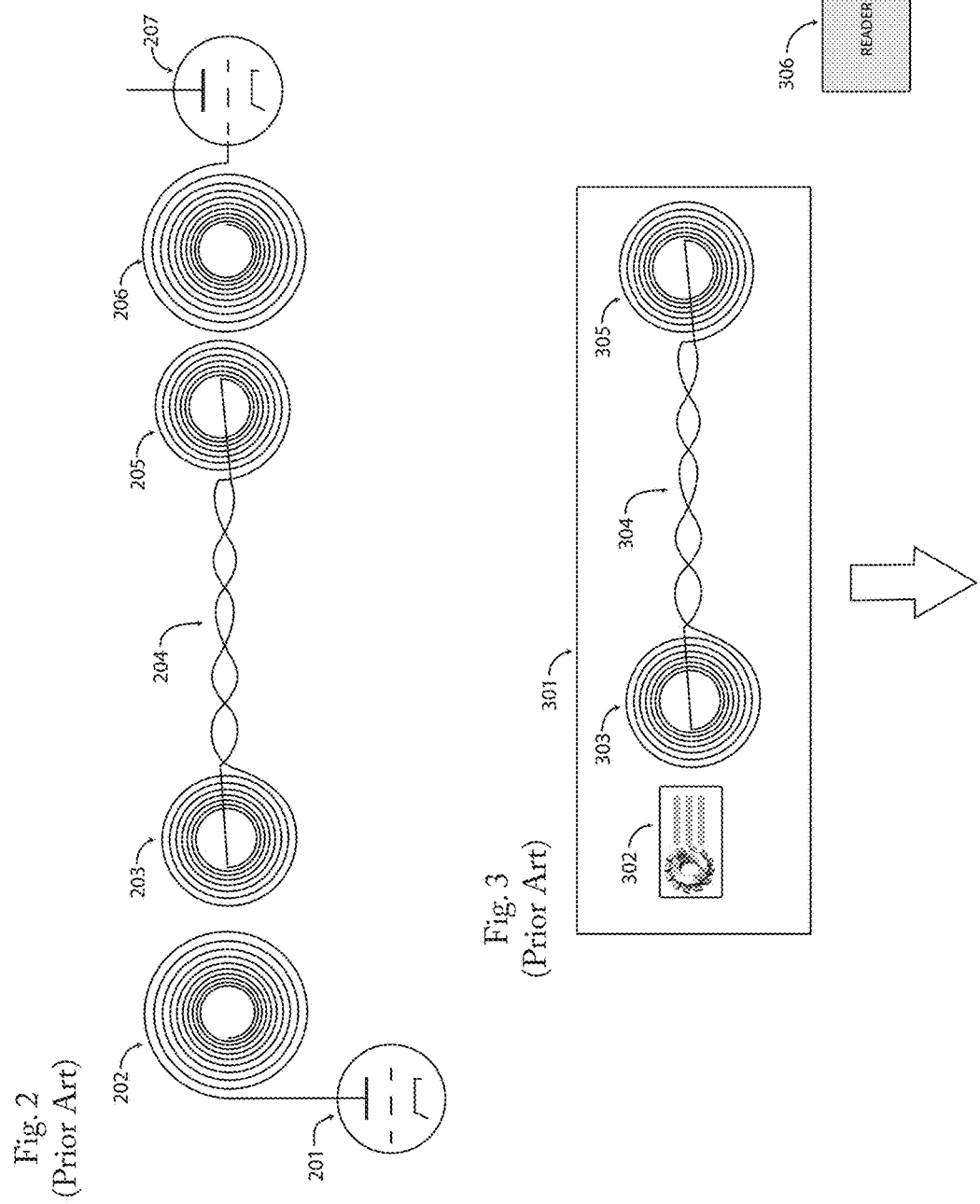

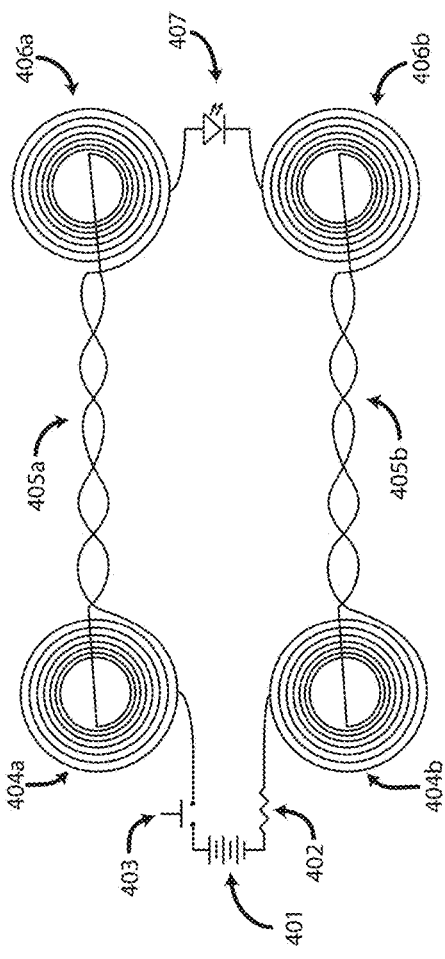
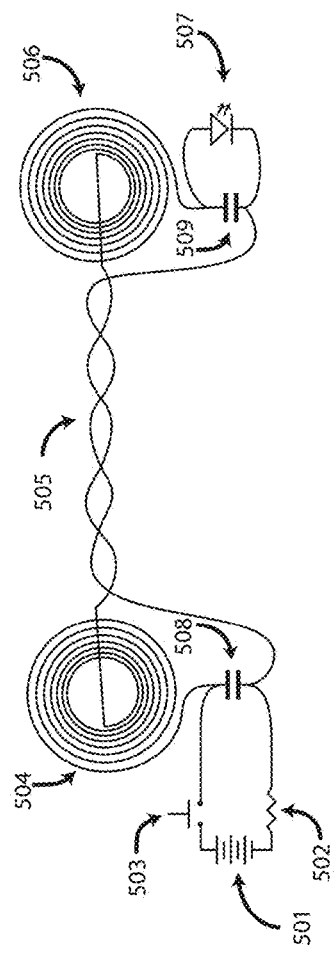
Fig. 4
Fig. 5

SYSTEM AND METHOD FOR INTEGRATING CREDENTIAL READERS

CROSS REFERENCE TO RELATED APPLICATIONS

The application claims the benefit of U.S. Provisional Application No. 62/273,698, filed on Dec. 31, 2015, which is incorporated by reference herein in its entirety.

FIELD OF INVENTION

The invention is related to credential readers of access control systems, and more particularly to readers for scanning an RFID input, such as a user credential.

BACKGROUND OF THE INVENTION

The invention relates generally to credential readers of access control systems, and more particularly to readers for scanning an RFID (radio frequency identification) input, such as a user credential.

Much engineering effort has been expended to integrate multiple readers into a single housing. This effort is generally directed to using various techniques to multiplex one antenna to multiple technologies. This integration is generally driven by at least two factors, improved aesthetic and functional upgrade. Multiple read heads on or near a door or other access point may be ugly and confusing to the users. As reader technologies, modulation methods and cryptographic techniques improve, there may be a strong motivation to upgrade the credentials to improve the protection of the credential electronic indicium.

To date, efforts to integrate multiple technologies have not been very successful. One example is the attempted integration of two 125 KHz technologies: PSK (phase shift keying) and FSK (frequency shift keying). The device often took up to two seconds to read the presented credential and frequently failed to read the credential at all. With poor product performance, the product was withdrawn from the market.

Accordingly, it is desirable to provide an improved system, method and device for scanning a variety of RFID input, such as a variety of user credentials, that overcome drawbacks and inadequacies of known devices, methods and systems.

SUMMARY OF THE INVENTIONS

Generally speaking, in accordance with an embodiment of the invention, a system provides a single read head housing a plurality of credential pickup coils, and a plurality of readers physically isolated from the read head. Each credential pickup coil may be connected via transmission lines to its respective reader pickup coil (collectively referred to herein as "coupling assembly"), which is positioned proximate its respective reader such that electromagnetic signals may be transmitted between the reader pickup coil and its respective reader. Preferably, the coils lack a saturable core. The embodiment of invention addresses the responsiveness and integration issues with a novel method to combine two or more readers using magnetic coupling and transmission lines, effectively integrating the technologies into a single reader head.

An embodiment of the invention provides a switch, a voltage source, and an indicator, such as an LED (light emitting diode), between adjacent coupling assemblies.

Another embodiment of the invention provides a coupling assembly having a switch, a voltage source, an indicator, and two blocking capacitors.

Yet another embodiment of the invention is directed to a system having a voltage source between a pair of coupling assemblies and, a display control unit between another pair of coupling assemblies, and a display unit electrically connected between the two pairs of coupling assemblies.

Another embodiment of the invention includes a single housing for a plurality of reader pickup coils, the housing having shielding dividers between the reader-reader pickup coil combos from other reader-reader pickup coil combos, to block the reader signals from being "electromagnetically seen" by the other readers.

Still other objects and advantages of the invention will in part be obvious and will in part be apparent from the specification. Other features and advantages of this invention will become apparent in the following detailed description of exemplary embodiments of this invention with reference to the accompanying drawings.

BRIEF DESCRIPTION OF THE DRAWINGS

For a fuller understanding of the invention, reference is made to the following description taken in connection with the accompanying drawing, in which:

FIG. 1 is a schematic diagram of a system in accordance with an embodiment off the invention;

FIG. 2 is an illustration of a prior art link coupling system;

FIG. 3 is an illustration of a prior art RFID package;

FIG. 4 is a schematic diagram of a coupling assembly with an indicator in accordance with an embodiment of the invention;

FIG. 5 is a schematic diagram of a coupling assembly with an indicator in accordance with an embodiment of the invention;

DETAILED DESCRIPTION OF THE PREFERRED EMBODIMENTS

Figure 6:
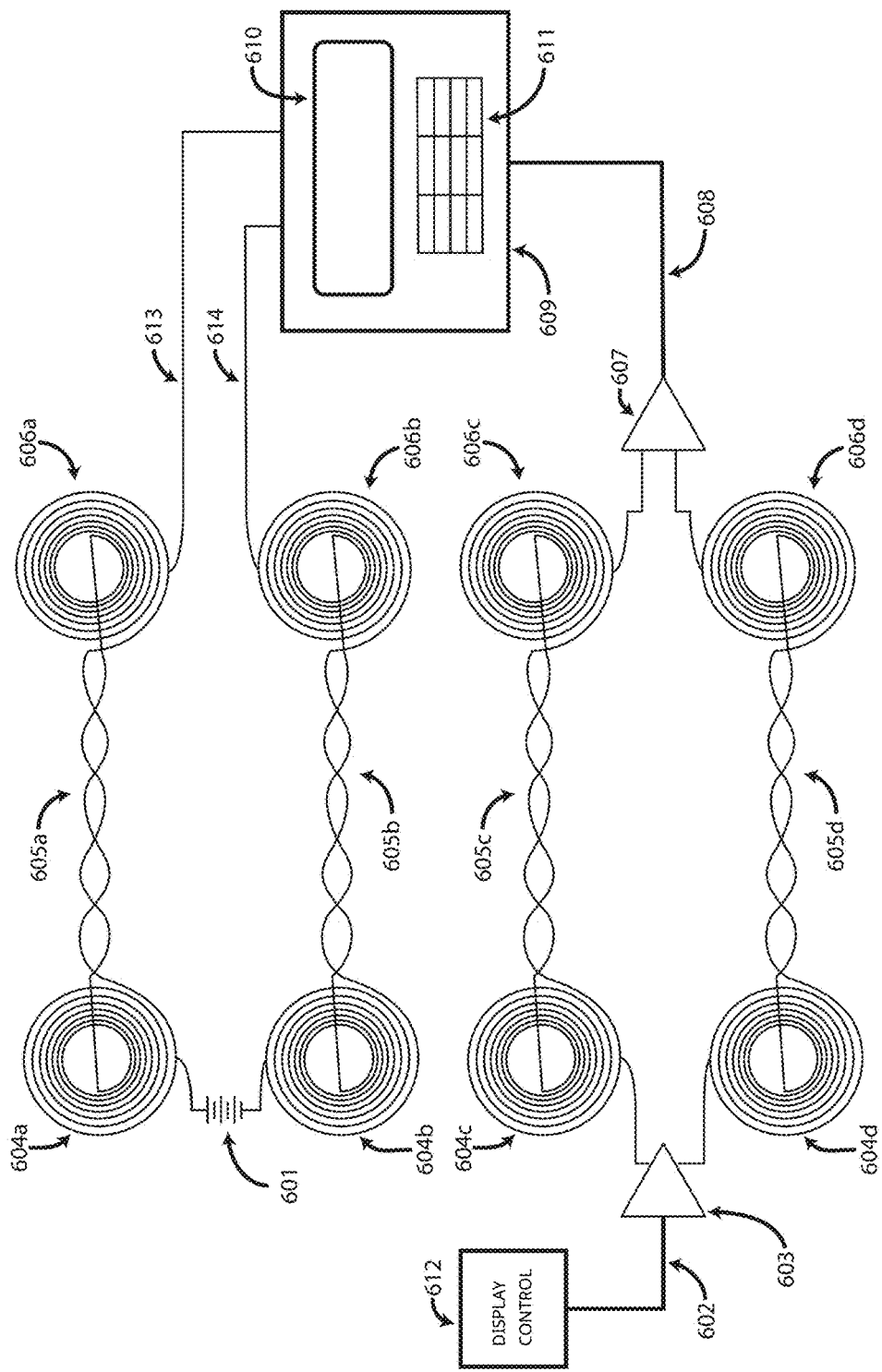
FIG. 6 is a schematic diagram of a coupling assembly with a display unit and a display control unit in accordance with an embodiment of the invention.

The invention generally is directed to an access control system, method and device for scanning an RFID input, such as a user credential presented by a user to a scanner such as a read head, transmitting the credential to a plurality of credential readers (hereinafter referred to generally as "reader" or "readers") via a link coupling assembly, and transmitting a signal from the reader to the read head. A coupling assembly generally comprises a credential pickup coil, a transmission line and a reader pickup coil.

Embodiments of the invention described herein address the responsiveness and integration issues with a novel method to combine two or more readers using magnetic coupling and transmission lines, effectively integrating the technologies into a single reader head. This technique preferably preserves the building aesthetic, while isolating the reader electronics and control wiring from the environment and preserving the cryptographic protections offered by certain reader technologies.

By way of example, a user may present their building access card having a user credential embedded therein to a read head located by a door, thus entering the near fields of plurality of credential pickup coils in the read head. If any of the readers shares the modulation technology, preferably both the frequency and modulation, with the credential, it will generate a successful read of the credential and grant the user access and unlock the door if the user is an authorized user for that particular door. If the user is not authorized, the door will not open, and preferably an indicator, display screen or other alerting mechanism may indicate that the user lacks authority. The other readers will preferably not respond to the credential.

Two frequency ranges are in common use with credential readers, the 125 to 130 KHz range for the older proximity credentials and the newer 13.58 MHz Industrial, Scientific, and Medical radio (ISM) band for newer credentials. Known as passive credentials, both technologies commonly use energy from the reader to power electronics on the card having the credential indicium therein. Another credential type has an onboard power supply, such as batteries, that power the electronics for longer read ranges. The techniques described below work with either credential type.

Because different credential manufacturers use different modulation schemes, activating and reading the credentials is often a hindrance for quickly identifying what sort of credential was presented, and then reading the credential data. Employing the same antenna for both the PSK and FSK technologies is a difficulty of this scheme.

Unlike the methods currently available, embodiments of the invention use link coupling to overcome these drawbacks. The technique of using coils coupled to a transmission line has a long history. One reference to link coupling is in the 1936 edition of *The Radio Antenna Handbook* edited by W. W. Smith. On page 11, diagram "C" shows a link coupling circuit. A more rigorous treatment of the technique is in the 1941 edition of the *Radiotron Designer's Handbook* on pages 125 through 126. This book illuminates the technique shown in FIG. 16 with mathematics on page 139. The 1938 book, *The Radio Handbook* edited by W. W. Smith, which discusses link coupling states on page 282, "It allows the separation between transmitter stages of distances up to several feet without appreciable r.f. losses." However, the technology available in the 1930s for larger transmitters required large heavy equipment typically fixed in physical relationship. The link coupling allowed the 1930s' engineer to build the transmitter in sections, an exciter that generates the modulated RF signal and a final or high power amplifier is one example. Additionally, the application had unidirectional flow, for example, from the exciter to the final transmitter stage. In contrast, an embodiment of the invention allows a bidirectional flow between the reader and the credential.

In accordance with an embodiment of the invention, the reader may be connected via a cable or other means to a control panel or otherwise access a database to determine if the credential grants the user access to the door at which the access card was scanned. Preferably, the reader is located at a substantive distance from the read head, for example, in a separate room.

Reference is made to FIGS. 1 and 4-8, wherein certain exemplary embodiments of the invention are illustrated. In the embodiment shown in FIG. 1, a system includes a plurality of readers 101a, 101b ... 101n, reader pickup coils 102a, 102b ... 102n, transmission lines 104a, 104b ... 104n, credential pickup coils 105a, 105b ... 105n and a read head 106. Each reader 101a, 101b ... 101n is positioned proximate its respective reader pickup coil 102a, 102b ... 102n to permit the transfer of signals therebetween. Each transmission line 104a, 104b ... 104n preferably comprises a pair of electrical conductors and connects reader pickup coil 102a, 102b ... 102n to credential pickup coils 105a, 105b ... 105n respectively to permit the transfer of a signal and preferably also power therebetween. Such an arrangement is referred to herein as "a coupling assembly." FIG. 2 illustrates an example of a link coupling assembly as described by W. W. Smith, in which exciter tube 201 plate tank circuit coil 202 is coupled to link coil 203. The transmission line 204 transmits the exciter energy to coil 205. Coil 205 couples that energy to grid coil 206 of the amplifier 207.

In accordance with an embodiment of the invention, a single read head 106 houses the plurality of credential pickup coils 105a, 105b ... 105n and more preferably protects them from the environment. For example, the read head 106 may be located by, in or on a door, gate, elevator or other item or location via which a user may access a certain area. A user preferably brings a credential 107 close enough to read head 106 to place the credential 107 within readable range of credential pickup coils 105a, 105b ... 105n. Two or more of the credential pickup coils 105a, 105b ... 105n may overlap, either partially or completely if the associated reader technologies operate on different frequencies. Thus, incompatible reader technologies may be integrated into a single read head, which may be more aesthetically pleasing than providing multiple read heads, for example, by a door.

The credential pickup coils 105a, 105b ... 105n are preferably located at a sufficient distance from readers 101a, 101b ... 101n, such that readers 101a, 101b ... 101n are physically isolated from the read head 106. Preferably, readers 101a, 101b ... 101n are at least an inch, more preferably several feet from credential pickup coils 105a, 105b ... 105n. In certain situations, the room in which readers 101a, 101b ... 101n may be located farther from read head 106, and thus the preferred distance between readers 101a, 101b ... 101n and credential pickup coils 105a, 105b ... 105n may be about 3 feet or farther.

The reader pickup coils 102a, 102b ... 102n are preferably fixed in close proximity to readers 101a, 101b ... 101n. Preferably, the distance between the reader pickup coils 102a, 102b ... 102n and the readers 101a, 101b ... 101n is less than 3 inches, more preferably less than an inch, to permit wireless communication of data therebetween, for example, via electromagnetic coupling.

In accordance with a preferred embodiment, whereas read head 106 is provided in a public, unsecured area, reader pickup coils 102a, 102b ... 102n and readers 101a, 101b ... 101n are provided in a separate, secure room, such as a physically secure mechanical room. Preferably, associated access control panels of the readers 101a, 101b ... 101n are also located within the same secure room. The secure room may be environmentally controlled, for example, temperature, humidity, etc. Thus, the electronics of the readers 101a, 101b ... 101n may be made with components that no not need to be rated for challenging environments, which may reduce cost. Components with wider operating temperature range, for example, are typically significantly more expensive. The secure room is also preferably accessible by authorized personnel only.

Such an arrangement is contrary to a package like the example illustrated in FIG. 3, wherein an RFID tag 302 is deeply embedded in a pallet of material or a machine 301. Without the link coupling, RFID tag 302 would be out of range of reader 306. The link coupling coil 303 is adjacent to the RFID tag 302 and connects to transmission line 304.

The transmission line 304 couples with coil 305 which is located closer to the surface for reader access. As the pallet or machine 301 moves relative to the reader 306, the RFID tag 302 is successfully interrogated. Notably, the RFID tag or credential 302 travels with the link coupling circuit 303, 304 and 304, and the link coupling coil 303 is fixed proximate RFID tag 302. The reader 306 is brought in proximity to the pallet or machine to interrogate the RFID tag 302. Thus, RFID tag 302 is not presented to a plurality of readers, which presents certain drawbacks mentioned above and addressed by embodiments of the invention described herein.

In accordance with an exemplary embodiment of the invention, transmission lines 104a, 104b . . . 104n are positioned within a cable 103, such as a CAT-5 (category 5) cable, for example, an Ethernet cable. Preferably, more than one separate reader technologies are supported within a single cable. The Telecommunications Industry Association defines several example cables in the standard TIA-568. According to experiments performed, an industry standard CAT-5 Ethernet cable is a preferred 100 Ohm transmission line for certain frequencies of interest, such as 125 KHz and 13.58 MHz. The CAT-5 cable may support up to four separate reader technologies. As is understood by those skilled in the art, the invention is not limited to the examples of cables or frequencies described herein.

Ethernet cables generally provide four twisted pairs of insulated conductors therewithin and a single Ethernet cable may serve more than one reader. Preferably, reader 101a and reader pickup coil 102a are isolated electromagnetically from reader 101b and reader pickup coil 102b. More preferably, each reader-reader pickup coil combination is isolated electromagnetically from the other reader-reader pickup coil combinations. The isolation preferably results in the signals being transmitted to and/or from readers 101a, 101b . . . 101n being sufficiently isolated from each other as to permit multiple credential pickup coils 105a, 105b . . . 105n to be provided in a single reader housing without significant interference with one another. In accordance with an experiment performed, when the readers were allowed to electromagnetically "see" each other, the read range at the credential pickup coils was substantially reduced.

In accordance with an embodiment of the invention, the reader 101a uses FSK and reader 101b uses PSK modulation, which are mutually exclusive modulation schemes. When the credential 107 is close enough to the read head 106 and enters the near fields of the credential pickup coils 105a, 105b . . . 105n, readers 101a, 101b . . . 101n interrogate the credential 107 as it is presented to the read head 106. If credential 107 is a PSK credential, it will be read by reader 101b, which will extract data to compare to its respective database to determine whether or not to grant the user access. Whereas the FSK reader 101a may interfere with the PSK technology, the end users will preferably learn to position their credential 107 within the field of credential pickup coil 105b which allows the PSK signal from reader 101b to prevail and successfully interrogate the credential. If credential 107 is an FSK credential, it will be read by reader 101a. Likewise, if the credential 107 is the same modulation technology as another reader, that reader will read the credential 107.

An indicator may be incorporated into the design. For example, unused pairs of transmission lines in the cable may be utilized, the technique of phantom power as taught by U.S. Pat. No. 5,144,544, or other suitable methods may be used.

Referring to the embodiment illustrated in FIG. 4, an indicator, such as an LED may be provided. As shown, the negative leg of voltage source 401 is limited through a current-limiting impedance 402 and connected at a convenient connection location to coil 404b. The positive leg of voltage source 401 connects through switch 403 to a convenient connection location to coil 404a. The positive leg of the indicator 407 connects to a convenient connection location of coil 406a. The negative leg of the indicator 407 connects to a convenient connection location of coil 406b.

In contrast to the phantom power as used by power-over-Ethernet devices, the current required for the illustrated indicator 407 such as a Light Emitting Diode 407 will not saturate the coils 404a, 404b, 406a and 406b. Not having a saturable transformer core may relax the requirement for a center tap on coils 404a, 404b, 406a and 406b, allowing a convenient connection location. When closed, the switch 403 allows current to flow through transmission lines 405a and 405b to power the indicator 407.

Reference is made to an embodiment of the invention illustrated in FIG. 5, wherein the positive side of voltage source 501 is controlled by switch 503 and connected at a convenient connection location to coil 504 and one side of the blocking capacitor 508. The negative side of the voltage source is connected through limiting impedance 502 to one leg of transmission line 505 and the other side of blocking capacitor 508. In contrast with the phantom power as used by power-over-Ethernet devices, the modest current required for the LED indicator 507 do not saturate the coils 504 and 506. This modest current and the lack of a saturable transformer core in the preferred embodiment avoid saturation of coils 504 and 506. The positive terminal of indicator 507 is connected at a convenient connection location to coil 506 and one side of the blocking capacitor 509. The negative terminal of the indicator connects with the other side of blocking capacitor 508 and the leg of the transmission line 505 connected to the negative terminal of the voltages source via limiting impedance 502.

In operation in accordance with an embodiment of the invention, DC blocking capacitors 508 and 509 permit direct current (DC) to flow from the voltage source 501 through the indicator 507. Switch 503 controls the current which flows through transmission lines 505 to power the indicator 507. The capacitors 508 and 509 are preferably chosen to present minimal impedance at the credential operating frequency but a high impedance at the indicator operating current. This minimal impedance of the capacitors 508 and 509 at the credential operating frequency shunts the indicator and the indicator power circuitry, allowing the linked coil circuit to operate. At the indicator operating current frequencies, the capacitors 508 and 509 present an open circuit allowing the current to flow from the voltage source 501 to the indicator 507.

Reference is made to the embodiment of the invention illustrated in FIG. 6, wherein power source 601 delivers power, by connection to coils 604a and 604b, to display unit 609 incorporating a display 610 and keypad 611. Transmission lines 605a and 605b transmit power to display unit 609 by lines 613 and 614 comprising conductors, connected to coils 606a and 606b. Coils 604a, 604b, 606a, and 606b preferably do not have a saturable core, and hence connections may be made at any convenient connection location to either the coils 604a, 604b, 606a, 606b or transmission lines 605a, 605b. In the embodiment shown, power flows in common mode across the transmission lines 605a and 605b and do not interfere with the communication with the RFID credential. The RFID credential data flows in differential mode across the transmission line associated with the active coils. An explanation of common mode and differential mode is provided in "Understanding Common Mode Noise G019.A" published by Pulse a Technitrol Company. In accordance with an embodiment of the invention, display unit 609 includes the read head or vice versa, thus providing a single device which scans a user's access card to read the credential and displays data display 610, such as status of the request for access. For example, the display 610 may state whether access is granted or denied, or if additional input is required, such as a passcode which may be entered via the keypad 611 or another means. For example, display 610 may be a touchpad via which the user may enter the additional input. Display unit 609 or the read head may further include a camera, fingerprint scanner or other mechanism for obtaining information from the user.

Similarly, in the embodiment shown, data flows from the display control 612 via data line 602 to the differential interface circuit 603 by common mode across coils 604c and 604d to transmission lines 605c and 605d to coils 606c and 606d. Connections are made to differential interface circuit 607 by convenient connection location to coils 606c and 606d. Data flows from the differential interface circuit 607 via data line 608 to display 610.

As those skilled in the art would understand, interface circuit 603, 607 may be bidirectional, allowing data to flow to the display 609 as well as from the keypad 611 to flow back to the display control 612. Furthermore, a transmission line, if not employed for transmission of RFID signals, may be employed for differential transmission of data signals.

The reader, the access control panel, or a combination of the two, preferably provides the voltage source, limiting impedance, and the switch, which is not illustrated in herein. For example, referring to FIG. 4, voltage source 401, impedance 402, and switch 403 may be provided within readers 101a, 101b . . . 101n. As is known by those skilled in the art, the switch may be a semiconductor device like a transistor, and the voltage source and impedance may be replaced by a current source.

Figure 7:
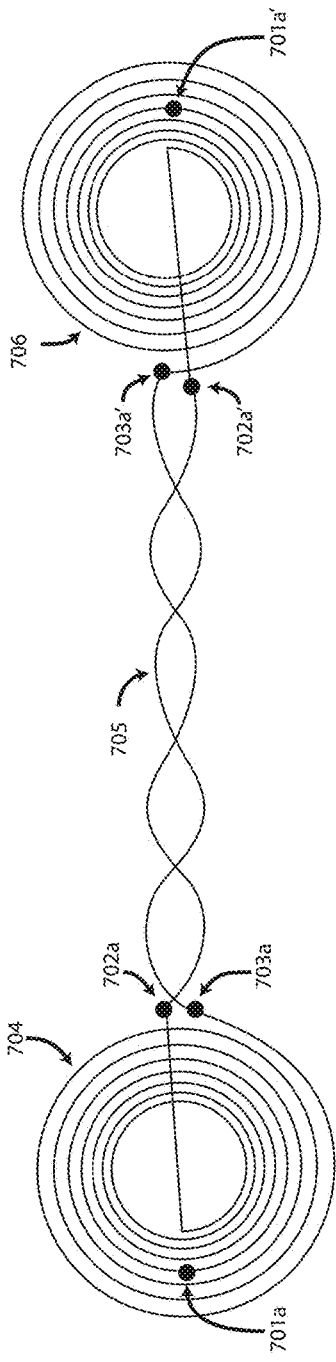
FIG. 7 is a schematic diagram of a coupling assembly in accordance with an embodiment of the invention.

Referring to FIG. 7, the meaning of "convenient connection location" is explained. FIG. 7 illustrates either leg of the coupling assembly shown in FIG. 4. Coils 704 and 706 are connected with transmission line 705. Exemplary convenient connection locations are shown as points 701a, 701a', 702a, 702a', 703a and 703a'. It should be noted that the connection does not need to be symmetrical, and the illustrated locations are non-limiting examples. Connections may be made at 702a and 703a'; or 701a and 702a'; or 702a and 702a'; or other combination of 701a, 702a, and 703a with 701a', 702a' and 703a'.

Preferably, the exemplary coils lack a saturable core, and thus direct current flow will not interfere with the RFID operation. In contrast, the characteristics of the coil with a saturable core would change with the application of an unbalanced current. This change of coil characteristic may interfere with the reading of the RFID credentials. The magnetic fields in coils may be characterized as ampere turns. One complete loop of wire with one ampere of current flowing is an ampere turn. A coil is saturated by exceeding an ampere turns value in a given geometry of a given coil. Ampere turns are a vector with both magnitude and direction. Saturating a core changes the characteristics of the coil, so typically this condition is avoided. Power-over-Ethernet devices generally employ a center-tap or connection midway through the windings of the coil. The current is then divided between the two halves of the coil. One half of the current flows clockwise and the other half flows counterclockwise. Because the ampere turns vectors point in opposite directions, this balance zeros the net ampere turns of the center tap sourced current in the coil's core. Center-tap coils are generally more costly and troublesome to manufacture than coils without center-taps and may limit the aesthetic choices.

As mentioned above, a preferred embodiment of the invention lacks a saturable core, and thus unbalanced current flow does not affect the operation of the RFID credential reading. Therefore, connections may be made either outside (702a, 702a', 703a, 703a') or inside (701a, 701a') the coil. The outside connections (702a, 702a', 703a, 703a') may be made either at any point along the transmission line 705, including the coil connection of the coil 704, 706 with the transmission line 705. The inside connection may be anywhere inside the coil including the center. People skilled in the art will recognize the advantages of a connection outside of the coil including manufacturing, servicing, and device aesthetics.

Figure 8:
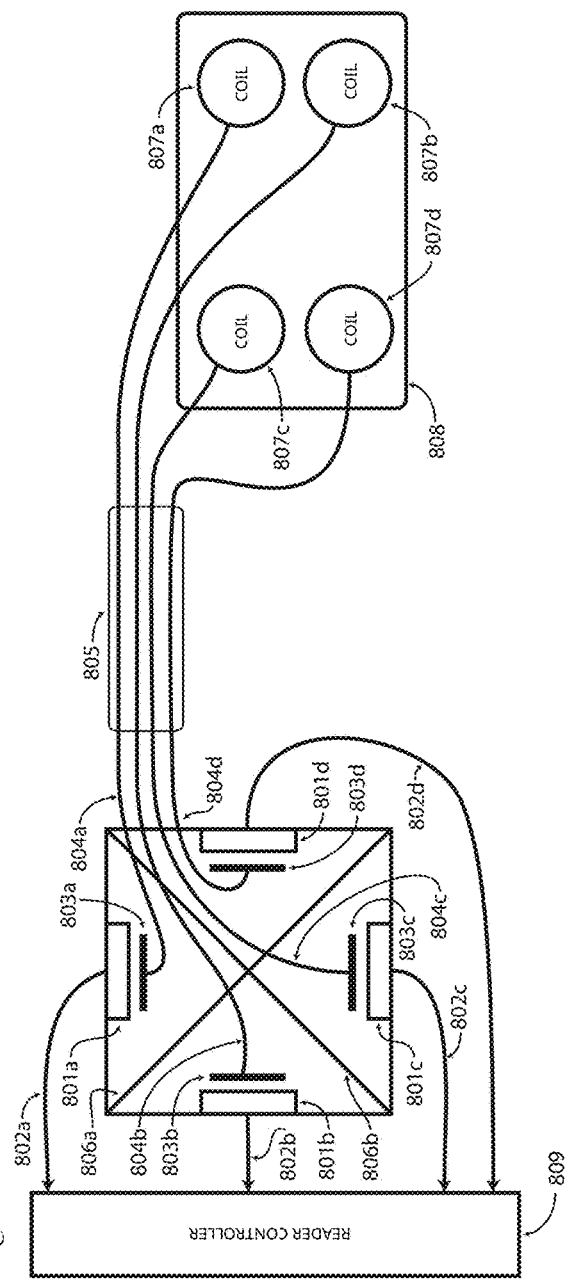
FIG. 8 is a schematic diagram of a system in accordance with an embodiment off the invention.

Referring to FIG. 8, the meaning of "readers not electromagnetically seeing each other" is explained. FIG. 8 shows a preferred embodiment of a reader blinding box. Readers 801a, 801b, 801c, and 801d are connected by control cables 802a, 802b, 802c, and 802d to reader controller 809. Other connections of reader controllers and/or reader combiners to control cables are contemplated. Readers 801a, 801b, 801c, and 801d are physically disposed close to reader pickup coils 803a, 803b, 803c and 803d. Their signals are carried by transmission lines 804a, 804b, 804c and 804d respectively to credential pickup coils 807a, 807b, 807c, and 807d respectfully, housed in read head 808. In the illustrated embodiment, these transmission lines are twisted pairs of CAT-5 cable system 805. However, other transmission lines are contemplated. CAT-5 cable system 805 may include connections, jacks and plugs. Shielding dividers 806a and 806b preferably block the reader signals from being "electromagnetically seen" by the other readers. For example, reader 801a and reader pickup coil 803a are shielded from the signals of readers 801b, 801c, and 801d. Other methods of "blinding" the readers from each other are contemplated.

People skilled in the art would understand that the indicator may be controlled by digital pulses transmitted in a manner similar to the embodiments illustrated in FIG. 4 and FIG. 5. Whereas the embodiments of the indicator are described above as an LED, other indicators are contemplated, such as a different lighting device, a sound-emitting device, or other device sensible by human or machine.

One of the benefits of certain embodiments of the invention is protecting the credential information by the same cryptographic technique as used by the credential itself. This method may be advantageous over other methods like OSDP (Open Supervised Device Protocol) which seek to cryptographically secure the data side of the reader. An embodiment of the invention does not introduce another cryptographic technique, and thus does not open another attack surface, making it generally inherently more secure.

Furthermore, a wider range of temperatures and other challenging environmental factors may be effectively overcome in embodiments wherein loops of wire are enclosed in a protective housing. Since the electronics of the reader are not located by or within the read head and are thus not exposed to the environment, the electronics components need not be rated for a challenging environment. Components with wider operating temperature range, for example, are generally significantly more expensive. This embodiment may include indicating devices which may be protected and/or rated for the environment. Those skilled in the art will recognize the potential advantage of limiting the use of devices rated for the challenging environment to the indicator(s) and the wire, rather than the entire reader electronics package.

Certain embodiments may protect a user's investment in the reader technology as new technologies are introduced. One known difficulty for introducing a newer credential technology is the transition period when the credential holders are being rebadged. By providing a system in which multiple reader technologies may be used with the same read head, the old technology reader may continue to be used or recycled for a different use, thereby preferably leveraging the investment in the older technology.

Furthermore, newer technologies may be chosen on their merits without considering support of the older technology during the transition. Prior technology often limited the choices of credentials to those made by a single manufacturer who also made a dual technology reader. This limited the security choices to a handful of credential technologies offered by a single manufacturer. Embodiments of the invention herein offer the freedom to choose a solution for the end user company without restricting choices to those that support the previously installed credential technology.

Preferably, the read head may have credential pickup coils removed, replaced, and added without requiring the read head itself to be replaced. Such an embodiment may allow the incorporation of logos or other decorative items, such as mullions, frames, handles, artwork, wainscoting, and other architectural details into the read head.

Additionally, the reader electronics may be incorporated into a controller assembly, for example, for controlling access to an area by unlocking or opening a door, gate, window, elevator, or other access point in response to the credential presented at the read head. For example, readers 101a, 101b . . . 101n may each include a controller assembly. Such an embodiment may improve security and lower cost.

An embodiment of the invention allows different readers to be connected to different access control panels. For example, readers 101a, 101b . . . 101n may each include an access control panel. Thus, credentials and their respective signals may be isolated, preferably completely, from each other while presenting one read head to the end user.

Another potential benefit of certain embodiments of the invention is the facilitation of maintenance on the system. By providing the readers in a mechanical room rather than in a public area such as by the door, maintenance operations may be performed in the mechanical room remote from the public areas without disrupting building operations or blocking the door. Additionally, by placing the reader in the mechanical room near the access control panel, maintenance that formally required two technicians, one to read a card at the door and one to monitor the access panel, may be performed by a single technician in the mechanical room.

Preferably, an embodiment of the invention is compatible with commercially available connector systems that preserve or substantially preserve the transmission line impedance. These connectors may be incorporated into the signal path. The Telecommunications Industry Association defines one such system in the standard TIA-568. This may afford the customer a known method of connection and a choice of test equipment to test and validate the cabling.

In accordance with a preferred embodiment of the invention, the credential pickup coils of the same or similar frequencies do not overlap by more than half of the diameter of the coil. Likewise, reader pickup coils of the same or similar frequencies preferably do not overlap by more than half of the diameter of the coil. Most preferably, the coils are positioned adjacent to each other without overlapping. The overlap of coils of similar or same frequencies may reduce the preferred distance between a reader pickup coil and its respective credential pickup coil. If the respective readers are of a broadly different frequencies, the coils may overlap completely.

Other alterations may be made without deviating from the scope of the invention. Accordingly, the system and method, the use, steps, order of steps, etc. may be varied as a matter of application specific design choice without deviating from the scope of the invention. For example, Litz wires may be utilized for winding lower frequency coils, such as for a 125 KHz system, or other wire which counteracts the "skin effect" of higher frequency current tending to hug the surface of a conductor. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall there between.

I claim:

1. A credential scanning system comprising:
a read head housing a first credential pickup coil and a second credential pickup coil;
a first transmission line connecting a first reader pickup coil to said first credential pickup coil;
a second transmission line connecting a second reader pickup coil to said second credential pickup coil;
a first reader within wireless transmission range of said first reader pickup coil, said first reader being electromagnetically isolated from said read head; and
a second reader within wireless transmission range of said second reader pickup coil;
wherein said first reader is electromagnetically isolated from said second reader;
wherein upon having a first credential presented to said read head, said first credential pickup coil interrogates said first credential and transmits said first credential to said first reader pickup coil, and said first reader is arranged to interrogate said first credential; and
wherein upon having a second credential presented to said read head, said second credential pickup coil interrogates said first credential and transmits said second credential to said second reader pickup coil, and said second reader is arranged to interrogate said second credential.

2. The system of claim 1, wherein said first reader pickup coil is permanently physically positioned proximate said first reader within wireless transmission range thereof.

3. The system of claim 1, wherein said first reader is physically isolated from said second reader.

4. The system of claim 1, further comprising a shielding divider between said first reader and said second reader.

5. The system of claim 1, wherein said first reader is physically isolated from said read head.

6. The system of claim 1, wherein said first reader is located in a secured room and said read head is located in an area external to said secured room.

7. The system of claim 1, further comprising a first access control panel connected to said first reader.

8. The system of claim 1, further comprising a power source between said first reader pickup coil and said second reader pickup coil.

9. The system of claim 1, further comprising an indicator between said first credential pickup coil and said second credential pickup coil.

10. The system of claim 1, further comprising a power source and a first blocking capacitor connected to said first reader pickup coil and an indicator and second blocking capacitor connected to said first credential pickup coil.

11. The system of claim 1, wherein said first reader utilizes a first modulation technology and said second reader utilizes a second modulation technology different from said first modulation technology.

12. The system of claim 1, wherein said first credential pickup coil operates on a first frequency and said second credential pickup coil operates on a second frequency different from said first frequency.

13. A credential scanning system comprising:
a read head housing a first credential pickup coil and a second credential pickup coil;
a first transmission line connecting a first reader pickup coil to said first credential pickup coil;
a second transmission line connecting a second reader pickup coil to said second credential pickup coil;
a first reader within wireless transmission range of said first reader pickup coil, said first reader utilizing a first modulation technology, said first reader being electromagnetically isolated from said read head; and
a second reader within wireless transmission range of said second reader pickup coil, said second reader utilizing a second modulation technology different from said first modulation technology;
wherein said first reader is electromagnetically isolated from said second reader;
wherein said first reader interrogates a first credential utilizing a credential modulation technology when said first credential is within range of said first credential pickup coil, and said second reader interrogates said first credential when said first credential is within range of said second credential pickup coil;
wherein said first credential pickup coil is arranged to transmit said credential to said first reader pickup coil if said credential modulation technology is equivalent to said first modulation technology, said first reader reads said credential, and
wherein said second credential pickup coil is arranged to transmit said credential to said second reader pickup coil if said credential modulation technology is equivalent to said second modulation technology, and said second reader reads said first credential.

14. The system of claim 13, wherein said first reader is physically isolated from said second reader.

15. The system of claim 13, further comprising a shielding divider between said first reader and said second reader.

16. The system of claim 13, wherein said first reader is physically isolated from said read head.

17. The system of claim 13, wherein said first reader is located in a secured room and said read head is located in an area external to said secured room.

18. The system of claim 13, further comprising a first access control panel connected to said first reader.

19. The system of claim 13, further comprising a power source between said first reader pickup coil and said second reader pickup coil.

20. The system of claim 13, further comprising an indicator between said first credential pickup coil and said second credential pickup coil.

21. The system of claim 13, further comprising a power source and a first blocking capacitor connected to said first reader pickup coil and an indicator and second blocking capacitor connected to said first credential pickup coil.

22. The system of claim 13, wherein said first credential pickup coil operates on a first frequency and said second credential pickup coil operates on a second frequency different from said first frequency.

23. A method for reading a credential to determine whether or not to grant access requested by a user, said method comprising:
providing a first credential coil and a first reader pickup coil connected by a first transmission line;
providing a second credential coil and a second reader pickup coil connected by a second transmission line;
providing a read head housing said first credential coil and said second credential coil;
providing a first reader utilizing a first modulation technology, said first reader being in wireless communication with said first reader pickup coil, wherein said first reader is electromagnetically isolated from said read head;
providing a second reader utilizing a second modulation technology different from said first modulation technology, said second reader being in wireless communication with said second reader pickup coil, wherein said second reader is electromagnetically isolated from said first reader;
interrogating a credential with said first reader when said credential is within readable range of a first credential coil;
interrogating said credential with said second reader when said credential is within readable range of a second credential coil;
determining if said credential utilizes said first modulation technology;
determining if said credential utilizes said second modulation technology; and
if said credential utilizes said first modulation technology, transmitting said credential from said first credential coil to said first reader pickup coil and reading said credential with said first reader, and if said credential utilizes said second modulation technology, transmitting said credential from said second credential coil to said second reader pickup coil and reading said credential with said second reader.

24. The method of claim 23, further comprising transmitting a credential data of said credential to a first access control panel connected to said first reader and determining whether or not to grant access.

25. The method of claim 23, further comprising maintaining said first reader physically isolated from said second reader.

26. The method of claim 23, further comprising indicating whether or not access is granted.

27. The method of claim 23, further comprising transmitting data in differential mode and transferring power in common mode.

28. The method of claim 23, further comprising displaying a message on a display unit.

* * * * *